Figure 1:
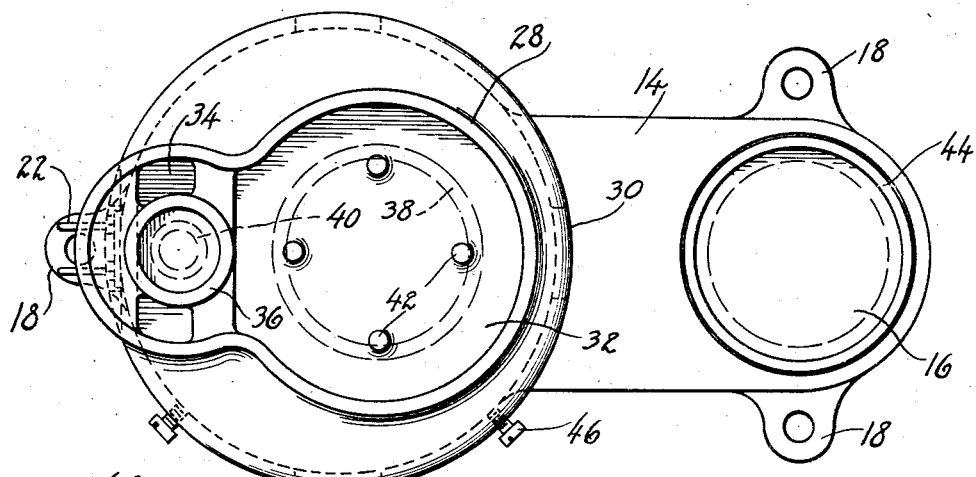

Feb. 28, 1939. G. M. GRAHAM 2,148,742

PISTON AND WRIST-PIN HEATER

Filed Nov. 15, 1935

INVENTOR.
George M. Graham
BY
Parker & Burton
ATTORNEYS.

Patented Feb. 28, 1939

2,148,742

UNITED STATES PATENT OFFICE 2,148,742

PISTON AND WRIST-PIN HEATER

George M. Graham, Detroit, Mich., assignor to Hinckley-Myers Company, Jackson, Mich., a corporation of Michigan Application November 15, 1935, Serial No. 49,878

6 Claims. (Cl. 219—43)

This invention relates to an improved method of and an improved apparatus for heating pistons and piston pins prior to their assembly.

An important object of this invention is to provide an efficient, unitary structure for heating a piston and a piston pin simultaneously and to approximately the same temperature. The improved structure is arranged to heat the piston and the pin in separate compartments which may contain different liquids. The invention is particularly adaptable in connection with light weight, thin walled pistons, such as those composed of aluminum or some light weight alloy, in which the pin aperture is of less diameter than that of the pin. The invention comprises a device which is adapted to heat the piston walls and enlarge the aperture through which the pin is inserted. The invention overcomes a difficulty which has arisen in the past in attempting to insert a cold pin, or a pin varying greatly in temperature from that of the piston, into the piston whose walls, because of their composition, are very likely to bend or distort when the operation is attempted.

A further object of this invention is to provide a novel method of heating a piston and piston pin to substantially the same temperatures but in different kinds of baths, particularly one which lubricates one of the parts at the same time the heating operation is performed. More specifically, the method comprises heating the piston in water to a temperature not above the boiling point of water and heating the piston pin in oil to a temperature not above the boiling point of water. The oil and water baths are associated together in the same unitary structure, the oil bath being contained in a separate vessel immersed in the water bath and receiving its heat therefrom. When the piston and pin are removed from their respective baths they have substantially the same temperature, and one of them, the pin in this instance, is in a lubricated condition which facilitates its insertion within the pin receiving aperture of the piston. In this condition they are ready for assembly without danger of injuring or distorting the walls of the piston.

A meritorious feature of the apparatus resides in the provision of a support affixed to the base of the heater structure and extending laterally therefrom for holding the piston in steady upright position while the pin is inserted therethrough. An additional feature of this provision is the variable character of the support which may be adapted to accommodate differently sized pistons. The association of such a support with the heater combines all the necessary steps of heating and assembling in one portable, unitary structure.

Other objects, advantages and meritorious features will more fully appear from the following description, appended claims, and accompanying drawing, wherein,—

Figure 2:
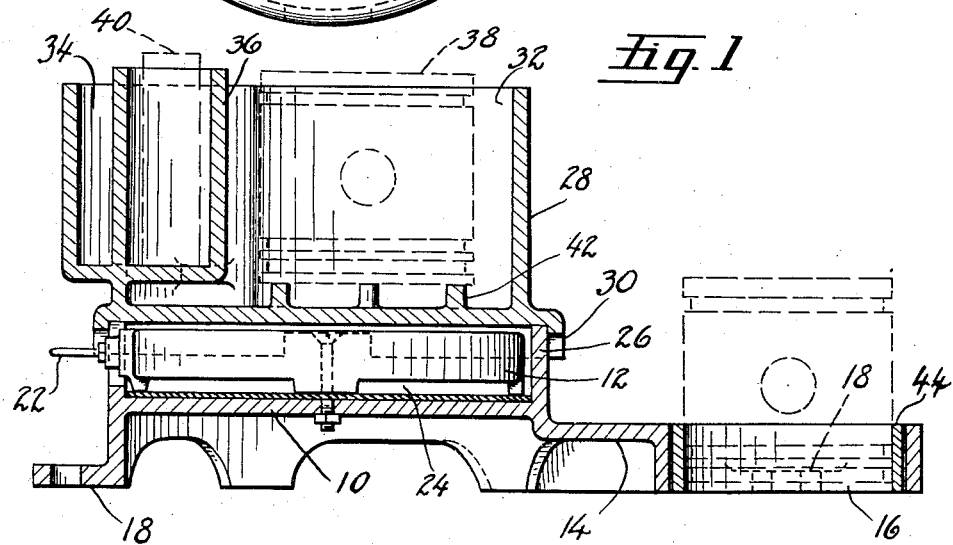
Figure 3:
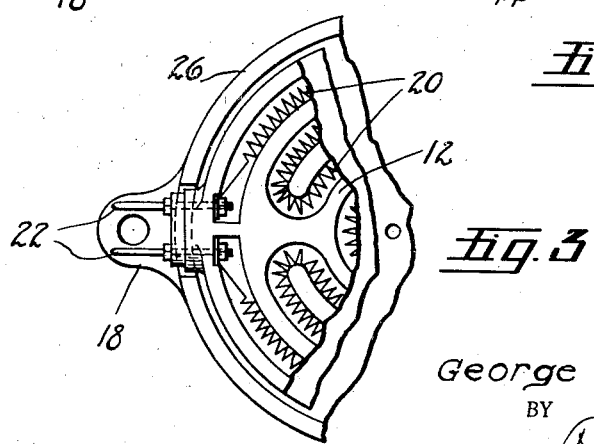

Fig. 1 is a top view of the heater structure showing the position of the receptacles for receiving the piston and the pin therefore and the lateral support on which the final act of assembly takes place, Fig. 2 is a cross-sectional view through the heater showing the position of the parts as viewed from the side, Fig. 3 is a detail view showing the electrical heating element and the manner of conducting current thereto.

In the embodiment of the invention illustrated herein, reference numeral 10 indicates a base member of a heater assembly having a depending flange to support an electrical heating device 12 in spaced relation above the surface upon which the base is mounted. The base member is provided with a laterally extending part 14 having an aperture 16, the purpose of which will be more fully described hereinafter. Ears 18 on the base and lateral extending part thereof may be used to fasten the device to any suitable surface.

The heating device 12 may comprise a porcelain insulating member grooved in the customary manner to receive several turns of an electric heating resistance wire 20 as shown in Fig. 3. The terminals for the device are indicated at 22. This heating element is seated within a recess 24 formed by an upright circular wall 26.

Removably carried by the base member above the heating device 12 is a vessel or receptacle 28 having a depending flange 30 which may encircle the wall 26 with the vessel superposing the recess 24 within which the heating element is disposed. This receptacle is divided into a main compartment 32 for receiving the piston and a subsidiary compartment 34 in which a smaller vessel or receptacle 36 is positioned. The smaller receptacle 36 is integrally joined to the side walls of the larger receptacle and, as indicated in the drawing, clearance is provided all around and under this receptacle. The upper structure of the apparatus, including the receptacles 28 and 36, may be cast in a unit.

As shown by the dotted lines in the figures, the larger receptacle receives the piston 38, preferably in upside down position, and the smaller receptacle receives the piston pin 40. Upstanding elements or pegs 42 support the piston above the floor of the receptacle in which it is placed. Water is poured into the larger receptacle until the piston is practically immersed therein. Oil is poured in the smaller receptacle 36 which, besides functioning as the immediate heating element through which heat is transmitted to the piston pin, also functions to lubricate the surface of the piston pin.

When the heating coil is energized, the water in the large receptacle is heated preferably until boiling. The clearance provided around and under the smaller receptacle permits the water to circulate therearound and quickly yield its heat to the contents of the small receptacle. Thus both the piston and piston pin are heated to approximately the same temperature, that is, the boiling temperature of water.

After the piston and pin have attained this temperature, the piston is removed, turned right side up and deposited in the hole 16 on the lateral support 14. This hole can be made of varying diameters by the provision of removable rings 44 of varying thicknesses. By this provision, pistons of any size can be snugly received in the hole and supported against lateral movement when the pin is forced into the piston.

The pin is now removed from its bath and forcibly inserted into the piston, the oil on the surface of the pin facilitating its entrance. By heating both the pin and the piston to substantially the same temperature, actual operating conditions of the piston assembly in an internal combustion engine are simulated and the fit of the pin in such conditions is readily ascertained. If the fitting of the pin is too loose, another pin of the correct size can be heated and inserted in the piston. Thus, not only does the preheating of both the piston and the pin prevent bending or distortion of the walls of the piston as previously explained but also indicates how tight the fit will be in actual operation in an internal combustion engine.

Set screws 46 extending through the flange 30 may be used to removably clamp the receptacle unit to the wall 26 of the base unit.

The pistons are generally made of light weight metal, such as aluminum or other light weight material. The wrist pins are generally made of steel. When heated, the metal in the light weight pistons is expanded to a greater extent than the steel in the pins. The aperture through which the pin is inserted is thereby enlarged relative to the diameter of the pin. The pin may be readily inserted when the piston is in this condition and the oil film on the surface of the pin assists the advancement of the pin through the apertures in the walls of the piston.

I claim:

1. A heating device for preheating a piston and piston pin prior to their assembly which comprises, in combination, a main receptacle for receiving the piston, a subsidiary receptacle in the main receptacle for receiving the piston pin which is to be fitted in the piston, said receptacle adapted to contain liquids in which the part of the piston assembly which they contain is immersed, means for heating the liquid content of the main receptacle, said liquid content imparting heat to that in the smaller receptacle, and a support extending laterally from the device and provided with a hole of a size to receive the piston and assist in holding the same in upright position while the pin is inserted therethrough.

2. A unitary heating device for preheating a piston and a piston pin prior to their assembly comprising, in combination, a base having an electric heating element therein, a receptacle mounted on said base and adapted to contain water and the piston immersed therein, a smaller receptacle integrally supported from the walls of the first mentioned receptacle and adapted to be partially immersed in the water content of the latter, said smaller receptacle adapted to contain oil and the piston pin immersed therein, said oil being heated by the water content of the larger receptacle to a temperature approximating that of the water content and lubricating said piston prior to the assembling operation, said base having a laterally extending support provided with a hole for receiving said piston after its heating operation and assisting in supporting the same in upright position while the piston pin is fitted therein, and means for varying the diameter of the hole to accommodate pistons of varying sizes.

3. A heating device for preheating a piston and a piston pin prior to assembly comprising, in combination, a pair of die cast elements, one of said elements forming a base having a recess in the top thereof for holding an electric heating coil and having a laterally extending part having a circular hole of a size to receive a piston and support the same in upright position, the other element having a bottom adapted to be laid over the recess and supporting vertical wall sections forming two compartments of different sizes opening into one another so that the same liquid may be contained within both compartments, the larger compartment being circular in formation but oversize a piston so that a piston may be inserted therein and completely surrounded by any liquid therein, a hollow cylinder having a closed bottom disposed centrally in said smaller compartment in spaced relationship to the wall section thereof, the interior of said cylinder having a diameter greater than that of a piston pin so that a piston pin inserted therein may be completely surrounded by any liquid therein, means supporting said cylinder in spaced relationship above the floor of the compartments so that liquid in the compartments may flow under the bottom of the cylinder as well as around the cylinder, and means projecting above the floor of the piston receiving compartment at spaced points therearound for supporting a piston therein in spaced relationship above the floor of the compartment.

4. A heating device for preheating a piston and a piston pin prior to their assembly comprising, in combination, a base support having an opened top recess therein in which an electric heating coil is disposed, a separate receptacle removably supported upon said base support and having a bottom adapted to extend over said recess in close proximity to the heating coil therein, said receptacle having a primary compartment and a subsidiary compartment opening laterally therefrom, said compartments formed by a single wall extending in a relatively large almost complete circle of a diameter substantially greater than that of a piston and a smaller almost complete circle of a diameter substantially less than that of a piston but greater than that of a piston pin, a hollow vertically extending cylinder formed integrally with said single wall and disposed centrally within the subsidiary compartment in spaced relationship to the side walls and bottom thereof, said hollow cylinder being of a size to receive a piston pin.

5. The invention defined in claim 4 characterized by the fact that the primary compartment is provided with means for supporting a piston therein in spaced relationship from the bottom of the receptacle.

6. In combination with a device for heat treating a piston and piston pin prior to their assembly, a part projecting laterally to one side of the heat treating portion of the device and provided with a circular hole therein at least equal in diameter to that of the larger size pistons, said hole adapted to receive a piston upon endwise insertion therein and assist in supporting the same during the fitting of the piston pin, a ring having an outside diameter substantially equal to that of the hole adapted upon insertion in the hole to reduce the size of the hole for support of smaller size pistons, the top of said hole and the surface surrounding thereabout extending to a height less than the distance separating one end of the piston from the portion therein through which the pin is inserted so that when a piston is disposed endwise in the supporting hole of the part the pin may be inserted without interference from the surrounding parts of the structure.

GEORGE M. GRAHAM.